(12) United States Patent
Lu et al.

(10) Patent No.: US 10,331,847 B2
(45) Date of Patent: Jun. 25, 2019

(54) AUTOMATED ELECTRONIC COMPONENT FOOTPRINT SETUP SYSTEM AND A METHOD THEREOF

(71) Applicant: FootPrintKu Inc., Kaohsiung (TW)

(72) Inventors: Cheng-Ta Lu, Kaohsiung (TW);
Yu-Siang Fan Jiang, Kaohsiung (TW);
Jiun-Huei Ho, Kaohsiung (TW);
Chun-Chieh Tsai, Kaohsiung (TW);
Yi-Ting Chen, Kaohsiung (TW)

(73) Assignee: FOOTPRINTKU INC., Kaohsiung (TW)

(*) Notice: Subject to any disclaimer, the term of this patent is extended or adjusted under 35 U.S.C. 154(b) by 0 days.

(21) Appl. No.: 15/671,314

(22) Filed: Aug. 8, 2017

(65) Prior Publication Data
US 2019/0050503 A1 Feb. 14, 2019

(51) Int. Cl.
*G06F 17/50* (2006.01)
*G06F 16/23* (2019.01)

(52) U.S. Cl.
CPC .......... *G06F 17/509* (2013.01); *G06F 16/23* (2019.01); *G06F 17/5072* (2013.01); *G06F 2217/04* (2013.01); *G06F 2217/74* (2013.01)

(58) Field of Classification Search
CPC .......... G06F 17/5045; G06F 17/5068; G06F 17/5072; G06F 17/5081
USPC .................................................. 716/137, 139
See application file for complete search history.

(56) References Cited

U.S. PATENT DOCUMENTS

2007/0038967 A1* 2/2007 Brathwaite ............. G06F 17/50
716/102
2015/0302130 A1* 10/2015 Hirschman ......... G06F 17/5072
716/137

* cited by examiner

*Primary Examiner* — Paul Dinh
(74) *Attorney, Agent, or Firm* — Muncy, Geissler, Olds & Lowe, P.C.

(57) ABSTRACT

An automated electronic component footprint setup system and a method thereof are provided in the present disclosure. The system is available to not only an external first user for configuring characteristic parameters of an electronic component for the database but also an external second user for configuring setup parameters of an electronic component footprint to be created. Then, the system is to create an electronic component footprint of a specific electronic layout system according to the characteristic parameters of the electronic component, component setup regulations and the setup parameters, all of which correspond to the electronic component footprint.

6 Claims, 5 Drawing Sheets

AUTOMATED ELECTRONIC COMPONENT FOOTPRINT SETUP SYSTEM AND A METHOD THEREOF

BACKGROUND OF THE INVENTION

1. Field of the Invention

The present disclosure relates to a solution for electronic component footprint setup, particularly a technical solution by automatically creating an electronic component footprint.

2. Description of the Prior Art

A circuit layout engineer for PCB layouts of an electronic product usually draws needed electronic component footprints and creates a footprint database for follow-up circuit layouts.

With various electronic components emerging continuously, a circuit layout engineer has to update and revise a footprint database constantly. Furthermore, the cost of circuit layouts is raised when electronic component footprints corresponding to a different type of circuit are reconfigured by electronics engineer as required in the PCB manufacturing process.

The present disclosure provides a solution for PCB layouts without the above-mentioned problems.

SUMMARY OF THE INVENTION

To settle the above-mentioned problems, a technical solution of automatic electronic component footprint setup is provided in the present disclosure.

To this end, an automated electronic component footprint setup system is disclosed hereafter. The automated electronic component footprint setup system includes a component characteristic parameter user interface, a component characteristic parameter management module, a component characteristic parameter module, a footprint setup user interface, a setup regulation module, a characteristic operation module, a data transformation module and a component footprint setup module. The component characteristic parameter management module, which is connected to both the component characteristic parameter user interface and a database, is available to an external first user, operating the component characteristic parameter user interface for configuring characteristic parameters of an electronic component for the database. The component characteristic parameter module is connected to the database for accessing characteristic parameters of a corresponding electronic component. The footprint setup user interface is an interface on which setup parameters of an electronic component footprint to be created are configured by an external second user. The setup regulation module is connected to the database for accessing component setup regulations of a corresponding electronic component footprint in the database. The characteristic operation module, which is connected to the component characteristic parameter module, the footprint setup user interface and the setup regulation module, is used to configure characteristic parameters of an electronic component footprint to be created according to the characteristic parameters of the electronic component, the component setup regulations and the setup parameters, all of which correspond to the electronic component footprint. The data transformation module connected to the characteristic operation module transforms the characteristic parameters for conforming to data formats of a specific electronic layout system and offering transformed data. The component footprint setup module connected to the data transformation module is to create an electronic component footprint according to the transformed data.

To this end, a method of an automated electronic component footprint setup system in the present disclosure includes steps as follows: an external first user configures characteristic parameters of an electronic component for an external database; an external second user configures setup parameters of an electronic component footprint to be created; component setup regulations of a corresponding electronic component footprint are accessed in the database; characteristic parameters of an electronic component footprint are configured according to the characteristic parameters of the electronic component, the component setup regulations and the setup parameters; the characteristic parameters are transformed for conforming to data formats of a specific electronic layout system and offering transformed data; the electronic component footprint is created according to the transformed data.

In summary, an automated electronic component footprint setup system and a method thereof in the present disclosure rely on setup parameters of an electronic component footprint to be created and characteristic parameters of an electronic component to fast create an electronic component footprint, which conforms to rules of a specific electronic layout system, and reduce costs of drawing electronic component footprints with human errors during a manual drawing process avoided effectively.

BRIEF DESCRIPTION OF THE DRAWINGS

The technical content, purposes and effects of an automated electronic component footprint setup system and a method thereof in the present disclosure are further explained in preferred embodiments and accompanying drawings which are shown as follows.

DETAILED DESCRIPTION OF THE PREFERRED EMBODIMENTS

An automated electronic component footprint setup system and a method thereof are explained in preferred embodiments; however, these embodiments should not be considered as examples to limit the scope of the patent application.

Figure 1:
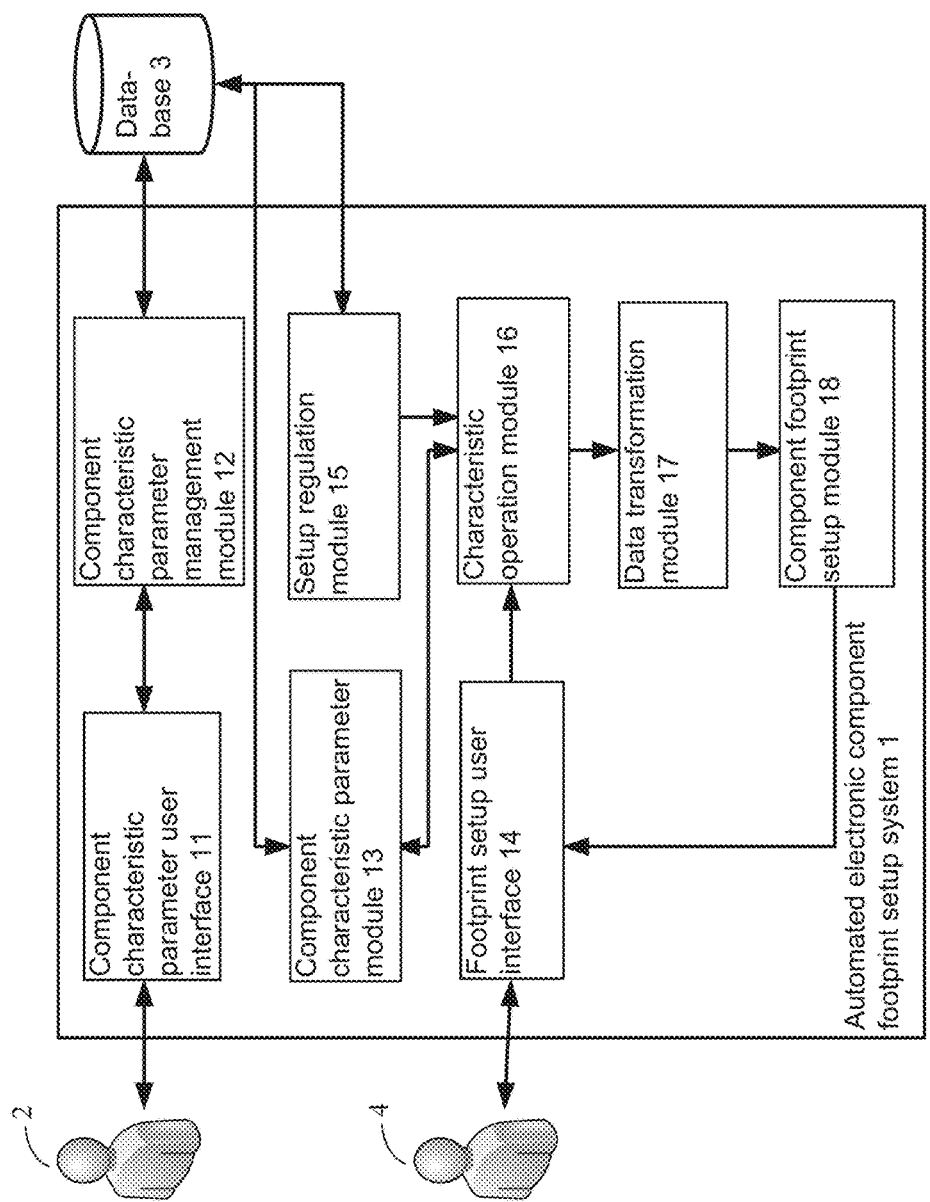
FIG. 1 is a schematic view of an automated electronic component footprint setup system according to a first embodiment.

Referring to FIG. 1, which is a schematic view of an automated electronic component footprint setup system 1 in the first embodiment. The system includes a component characteristic parameter user interface 11, a component characteristic parameter management module 12, a component characteristic parameter module 13, a footprint setup user interface 14, a setup regulation module 15, a characteristic operation module 16, a data transformation module 17 and a component footprint setup module 18. The component characteristic parameter management module 12, which is connected to both the component characteristic parameter user interface 11 and an external database 3, is available to an external first user 2 operating the component characteristic parameter user interface 11 for configuring characteristic parameters of an electronic component for the database 3. The component characteristic parameter module 13 is connected to the database 3 for accessing the characteristic parameters of a corresponding electronic component. The footprint setup user interface 14 provides an external second user 4 an interface on which setup parameters of an electronic component footprint to be created are configured. The setup regulation module 15 is connected to the database 3 for accessing component setup regulations of a corresponding electronic component footprint in the database 3. The characteristic operation module 16, which is connected to the component characteristic parameter module 13, the footprint setup user interface 14 and the setup regulation module 15, is able to configure characteristic parameters of an electronic component footprint to be created according to the characteristic parameters of the electronic component, the component setup regulations and the setup parameters, all of which correspond to the electronic component footprint. The data transformation module 17 connected to the characteristic operation module 16 transforms the characteristic parameters for conforming to data formats of a specific electronic layout system and offering transformed data. The component footprint setup module 18 is connected to the data transformation module 17 for creating an electronic component footprint according to the transformed data.

The component characteristic parameter user interface 11, the component characteristic parameter management module 12, the component characteristic parameter module 13, the footprint setup user interface 14, the setup regulation module 15, the characteristic operation module 16, the data transformation module 17 or the component footprint setup module 18 in the automated electronic component footprint setup system 1 are optionally provided with a software module or programmable digital circuitry running in a computer device. The circuit layout system is a software program for PCB (printed circuit board) circuit layouts, for example PCB design software such as, without limitation, Protel, OrCAD and Allegro.

In another embodiment, the electronic component footprint is the footprint of an electronic component mounted on a PCB. In a further embodiment, the setup parameters further include at least one of component sizes and pad sizes. In yet another embodiment, the characteristic parameters of the electronic component further includes at least one among package type, manufacturer information, part number and size information. In yet a further embodiment, the electronic component footprint follows at least one of layout rules and file formats for a circuit layout system.

Figure 2:
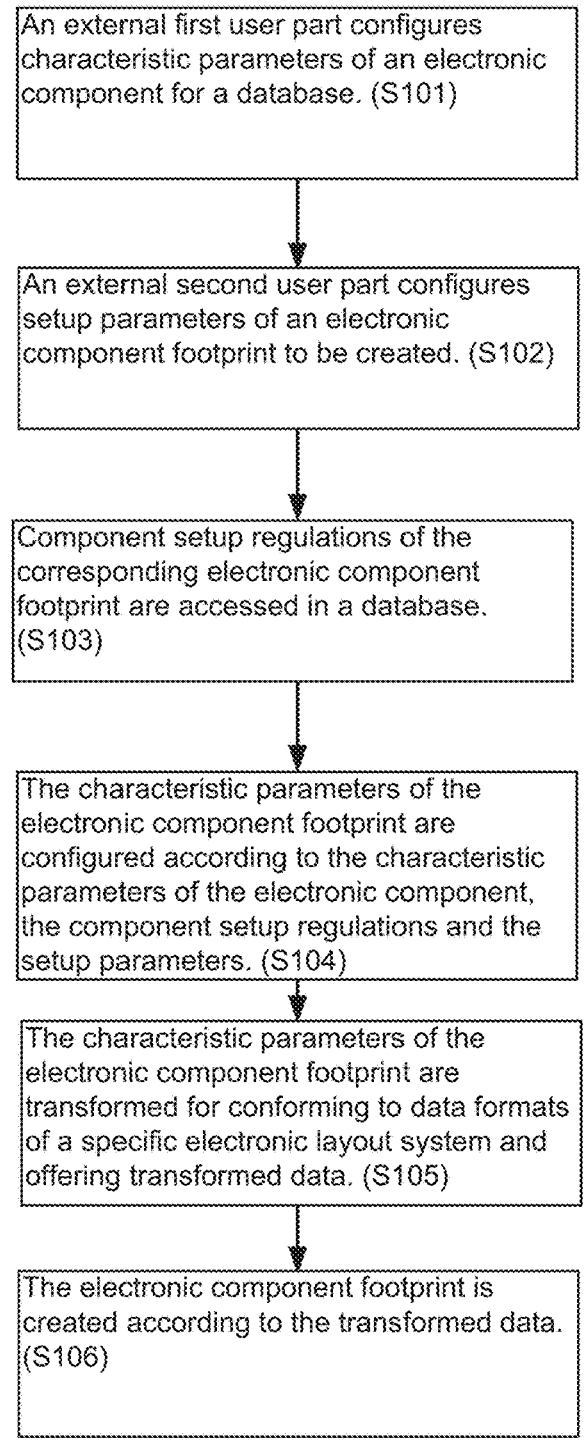
FIG. 2 is a flow chart for a method of an automated electronic component footprint setup system according to a second embodiment.

Referring to FIG. 2, which is a flow chart for a method of an automated electronic component footprint setup system. The method includes steps as follows:

S101: an external first user configures characteristic parameters of an electronic component for a database.

S102: an external second user configures setup parameters of an electronic component footprint to be created.

S103: component setup regulations of the corresponding electronic component footprint are accessed in a database.

S104: the characteristic parameters of the electronic component footprint are configured according to the characteristic parameters of the electronic component, the component setup regulations and the setup parameters.

S105: the characteristic parameters of the electronic component footprint are transformed for conforming to data formats of a specific electronic layout system and offering transformed data.

S106: the electronic component footprint is created according to the transformed data.

In another embodiment, the electronic component footprint in the method is the footprint of an electronic component mounted on a PCB. In yet another embodiment, the setup parameters in the method further include at least one of component sizes and pad sizes. In yet a further embodiment, the characteristic parameters of the electronic component in the method further include at least one among package type, manufacturer information, part number and size information.

In another embodiment, the electronic component footprint in the method follows at least one of layout rules and file formats for a circuit layout system.

Figure 3:
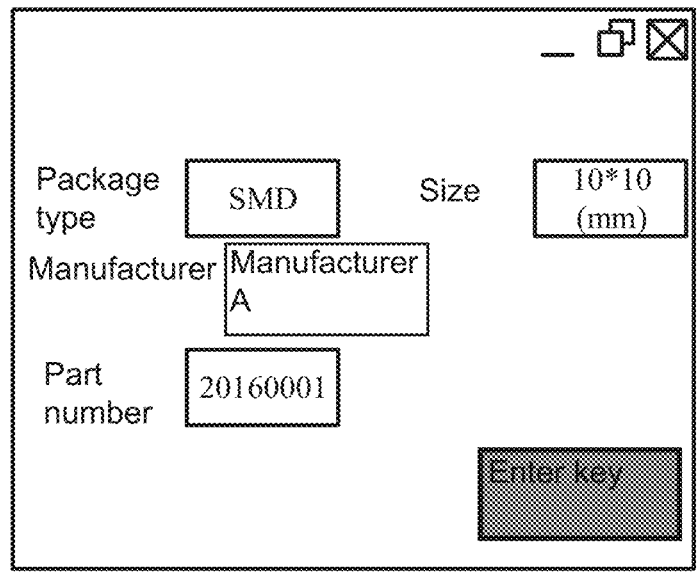
FIGS. 3 and 4 are schematic views to operate an automated electronic component footprint setup system.

An automated electronic component footprint setup system 1 in the present disclosure is explained in the first embodiment; moreover, a method of an automated electronic component footprint setup system in the second embodiment features equivalent or similar technical effects. Referring to FIG. 3, which is a schematic view of operating the component characteristic parameter user interface 11; the component characteristic parameter user interface 11 is a windowed interface on which multiple recorded parameters of an electronic component in the database 3 such as package type, manufacturer information, part number and size information are configured by the first user 2. In an operation mode, the database 3 is a cloud database set up in the cloud and accessed by one or more first users 2 to edit recorded parameters of an electronic component.

Figure 4:
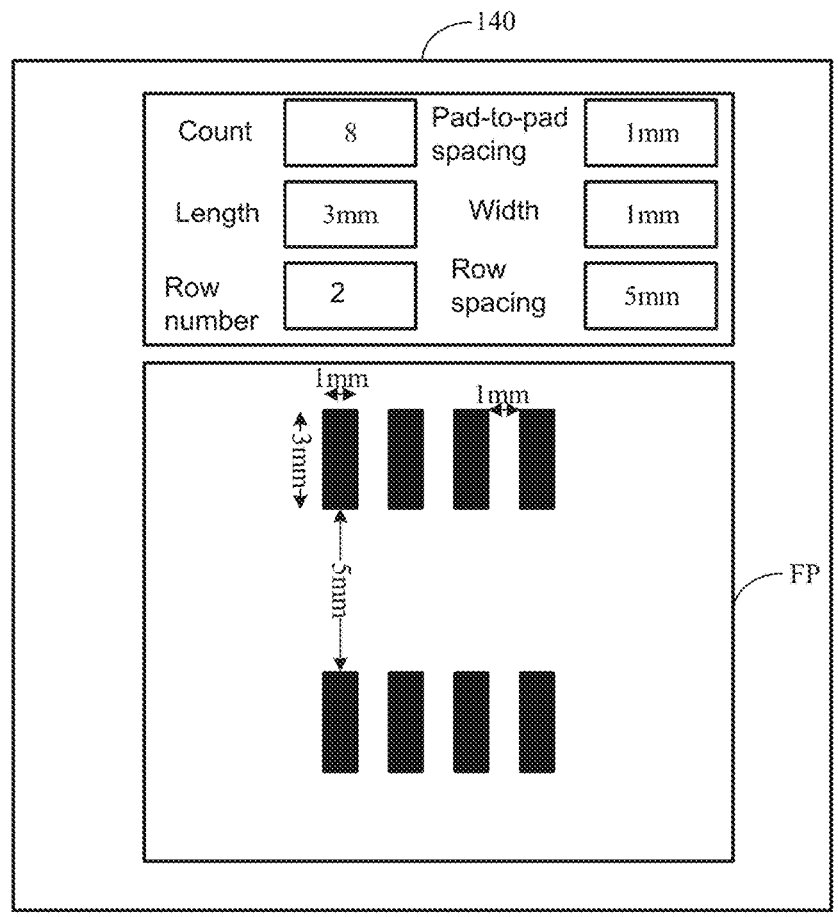
Figure 5:
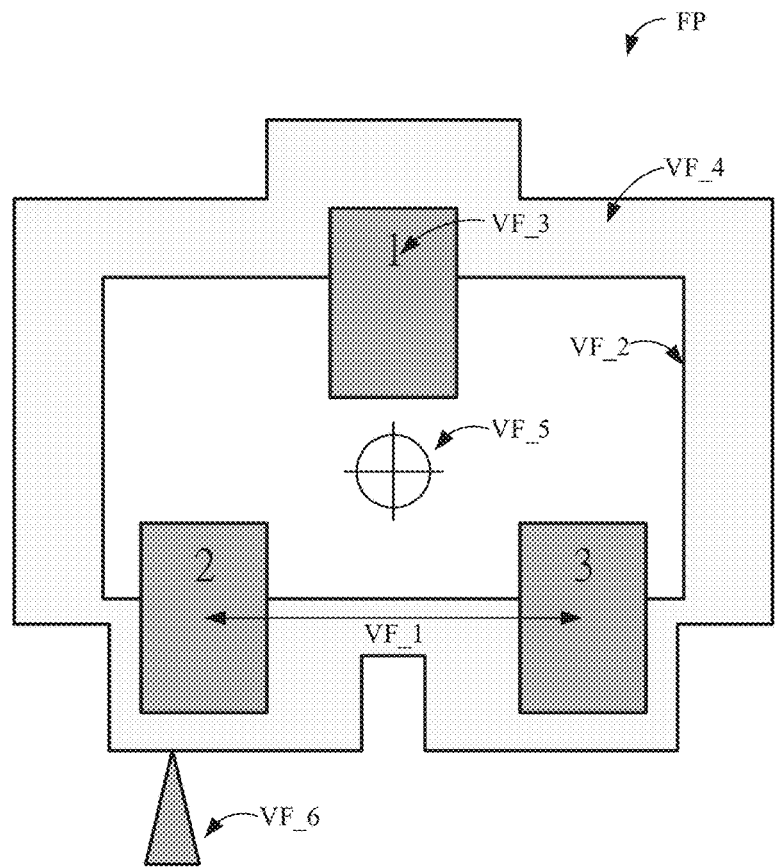
FIG. 5 is a schematic view of an electronic component footprint created completely.

Referring to FIG. 4, which is a schematic view of operating the footprint setup user interface 14 on which information such as parameters of an electronic component, component setup regulations, and a circuit layout system, etc. is configured by the second user 4. With configurations completed, the electronic component footprint FP, as shown in FIG. 5, is created by the automated electronic component footprint setup system 1 according to parameters configured on the component characteristic parameter user interface 11 and the footprint setup user interface 14.

The above examples are used to explain a feasible embodiments in the present disclosure; however, the embodiments are not intended to limit the scope of the patent application. Any equivalent modification or change without departing from the spirit of the present disclosure should be incorporated in the claims thereinafter.

Many changes and modifications in the above described embodiment of the invention can, of course, be carried out without departing from the scope thereof.

What is claimed is:

1. An automated electronic component footprint setup system, comprising:
   a component characteristic parameter user interface;
   a component characteristic parameter management module connected to the component characteristic parameter user interface and an external database for configuring characteristic parameters of an electronic component for the database by an external first user operating the component characteristic parameter user interface, wherein the characteristic parameters of the electronic component include package type, manufacturer information, part number and size information;

a component characteristic parameter module connected to the database for accessing the characteristic parameters of the electronic component;

a footprint setup user interface provided for configuring setup parameters of an electronic component footprint to be created by an external second user, wherein the setup parameters include component sizes and pad sizes;

a setup regulation module connected to the database for accessing component setup regulations of the electronic component footprint in the database;

a characteristic operation module connected to the component characteristic parameter management module, the footprint setup user interface and the setup regulation module for configuring characteristic parameters of the electronic component footprint to be created according to the characteristic parameters of the electronic component, the component setup regulations and the setup parameters;

a data transformation module connected to the characteristic operation module for transforming the characteristic parameters of the electronic component footprint for conforming to data formats of a specific electronic layout system and offering transformed data; and a component footprint setup module connected to the data transformation module for creating the electronic component footprint according to the transformed data.

2. The automated electronic component footprint setup system as claimed in claim 1, wherein the electronic component footprint is a footprint of the electronic component mounted on a PCB.

3. The automated electronic component footprint setup system as claimed in claim 1, wherein the electronic component footprint follows at least one of layout rules and file formats of a circuit layout system.

4. A method for setting up an automated electronic component footprint, comprising:

configuring characteristic parameters of an electronic component for an external database by an external first user, wherein the characteristic parameters of the electronic component include package type, manufacturer information, part number and size information;

configuring setup parameters of an electronic component footprint to be created by an external second user, wherein the setup parameters include component sizes and pad sizes;

accessing component setup regulations of the electronic component footprint in the database;

configuring characteristic parameters of the electronic component footprint according to the characteristic parameters of the electronic component, the component setup regulations and the setup parameters;

transforming the characteristic parameters of the electronic component footprint for conforming to data formats of a specific electronic layout system and offering transformed data to a component footprint setup module by a data transformation module; and creating the electronic component footprint according to the transformed data.

5. The method for setting up an electronic component footprint as claimed in claim 4, wherein the electronic component footprint is a footprint of an electronic component mounted on a PCB.

6. The method for setting up an electronic component footprint as claimed in claim 4, wherein the electronic component footprint follows at least one of layout rules and file formats of a circuit layout system.

* * * * *